United States Patent
Taki

(10) Patent No.: US 9,703,417 B2
(45) Date of Patent: Jul. 11, 2017

(54) INPUT DEVICE SET AND COMPOSITE INPUT DEVICE SET

(71) Applicants: Benesse Corporation, Okayama (JP); KOTO Co., Ltd., Kyoto (JP)

(72) Inventor: Yoshihiro Taki, Otsu (JP)

(73) Assignees: BENESSE CORPORATION, Okayama (JP); KOTO CO., LTD., Kyoto (JP)

( * ) Notice: Subject to any disclaimer, the term of this patent is extended or adjusted under 35 U.S.C. 154(b) by 0 days.

(21) Appl. No.: 14/908,546

(22) PCT Filed: Mar. 27, 2014

(86) PCT No.: PCT/JP2014/059004
§ 371 (c)(1),
(2) Date: Jan. 29, 2016

(87) PCT Pub. No.: WO2015/015834
PCT Pub. Date: Feb. 5, 2015

(65) Prior Publication Data
US 2016/0170556 A1    Jun. 16, 2016

(30) Foreign Application Priority Data
Jul. 31, 2013  (JP) ................. 2013-158577

(51) Int. Cl.
*G09G 5/00*    (2006.01)
*G06F 3/041*    (2006.01)
(Continued)

(52) U.S. Cl.
CPC ........ *G06F 3/0416* (2013.01); *A63F 13/2145* (2014.09); *G06F 3/0354* (2013.01); *G06F 3/03543* (2013.01); *G06F 3/0488* (2013.01)

(58) Field of Classification Search
USPC .......................... 345/156, 173–174
See application file for complete search history.

(56) References Cited

U.S. PATENT DOCUMENTS

2011/0316767 A1* 12/2011 Avrahami ............. G06F 1/1626
345/156
2012/0007817 A1*  1/2012 Heatherly ............. G06F 3/0416
345/173
(Continued)

FOREIGN PATENT DOCUMENTS

EP    2645216 A1    10/2013
JP    4043453 B2    2/2008
(Continued)

OTHER PUBLICATIONS

English Translation of International Search Report for PCT/JP2014/059004 dated May 27, 2014.

*Primary Examiner* — Roy Rabindranath
(74) *Attorney, Agent, or Firm* — Hubbs, Enatsky & Inoue PLLC

(57) ABSTRACT

An input device set that is placed on a touch panel and includes a collection of individually identifiable input devices, each of the input devices has a plurality of contacts that project from a base and input coordinates into the touch panel, each of the contacts includes a contact surface that touches a placing surface of the touch panel and inputs the coordinates and a coordinates identifying area that is included in the contact surface and includes a center of gravity of the contact surface, the coordinates identifying areas are disposed so as not to overlap one another among the input devices, and areas of the contact surfaces are disposed so as to overlap in at least two input devices.

10 Claims, 13 Drawing Sheets

(51) Int. Cl.
  *G06F 3/0488* (2013.01)
  *G06F 3/0354* (2013.01)
  *A63F 13/2145* (2014.01)

(56) References Cited

U.S. PATENT DOCUMENTS

2016/0001180 A1* 1/2016 Shi .................... G06F 3/0487
                                                  463/32
2016/0062480 A1* 3/2016 Ogawa ................ G06F 3/033
                                                  345/156

FOREIGN PATENT DOCUMENTS

| JP | 2008-123164 A | 5/2008 |
| JP | 2012-099093 A | 5/2012 |
| JP | 2012-168612 A | 9/2012 |
| WO | 2012/070593 A1 | 5/2012 |

\* cited by examiner

INPUT DEVICE SET AND COMPOSITE INPUT DEVICE SET

CROSS REFERENCE TO RELATED APPLICATIONS

This application is a National Stage of International Application No. PCT/JP2014/059004 filed on Mar. 27, 2014. The contents of each of the above documents are incorporated herein by reference in their entirety.

TECHNICAL FIELD

The present invention relates to an input device set for inputting coordinate information to a touch panel, and a composite input device set.

BACKGROUND ART

A terminal is known for having a touch panel that detects a plurality of contact coordinates. Such touch panels include, for example, an electrostatic capacitance type touch panel for detecting a change in capacitance.

A patent literature describes an input device set placed on a touch panel for inputting coordinates into the touch panel. Such input device set is a collection of input devices provided with specific information of "あ", "い", "う", "え", "お" . . . , and a group of specific information items forms a system of hiragana, for example. A bottom surface of each input device has a plurality of contact parts for touching a placing surface of the touch panel. The contact parts are respectively disposed in predetermined areas selected from divided areas of a bottom surface. Arrangement patterns of contact parts differ depending on input devices. The terminal identifies an input device according to an arrangement pattern of contact parts, and is able to obtain specific information provided to the input device.

A contact surface which has a predetermined area, such as a fingertip, needs to touch a placing surface of the touch panel in order to input coordinates into a touch panel. As such, the area of the bottom surface of the input device needs to be expanded to increase the number of the divided areas in order to increase the number of specific information items. This increases a size of the input device. However, in view of operability, the input device is preferably in a size that could be handled with one hand. For example, when a child uses an input device, the input device should be made as small as possible. Accordingly, for conventional input devices, it is difficult to increase both the number of specific information items and operability of the input device.

CITATION LIST

Patent Document

Patent Literature 1: JP2012-99093A

SUMMARY OF INVENTION

Technical Problem

One or more embodiments of the present invention have been conceived in view of the above, and an object thereof is to provide an input device set and a composite input device set having a lot of specific information items and excellent in operability.

Solution to Problem

An input device set according to one embodiment of the present invention is placed on a touch panel and includes a collection of individually identifiable input devices, each of the input devices has a plurality of contacts that project from a base and input coordinates into the touch panel, each of the contacts includes a contact surface that touches a placing surface of the touch panel and inputs the coordinates, and a coordinates identifying area that is included in the contact surface and includes a center of gravity of the contact surface, the coordinates identifying areas are disposed so as not to overlap one another among the input devices, and areas of the contact surfaces are disposed so as to overlap in at least two input devices.

In the input device set according to one embodiment of the present invention, the contacts include one or more reference contacts and an identifying contact, the coordinates identifying areas of the identifying contacts to the reference contacts are disposed so as not to overlap one another among the input devices, and areas of the contact surfaces are disposed so as to overlap in at least two input devices.

In the input device set according to one embodiment of the present invention, a plurality of the reference contacts are provided to the base.

In the input device set according to one embodiment of the present invention, the reference contacts are provided at three places on the base.

A composite input device set according to one embodiment of the present invention includes a plurality of input device sets, input devices included in each input device set share a same placement of positions of reference contacts, and placement positions of the reference contacts vary among the input device sets.

In the composite input device set according to one embodiment of the present invention, each of the input device sets is given a different system of specific information.

Advantageous Effects of Invention

In one embodiment of the present invention, areas of the contact surfaces of the identifying contacts are disposed so as to overlap each other in at least two input devices. As such, the number of arrangement patterns of the identifying contacts can be increased without expanding the facing surface of the input device. That is, the input device set according to one embodiment of the present invention is capable of having a lot of specific information items and excellent in operability. In addition, a contact surface is easily recognized because it is not necessary to reduce an area of the contact surface.

DESCRIPTION OF EMBODIMENTS

An input device set and a composite input device set according to one embodiment of the present invention will be discussed. This embodiment is described in the following description with reference to the Figures, in which like numbers represent the same or similar elements.

Embodiment 1

Figure 1:
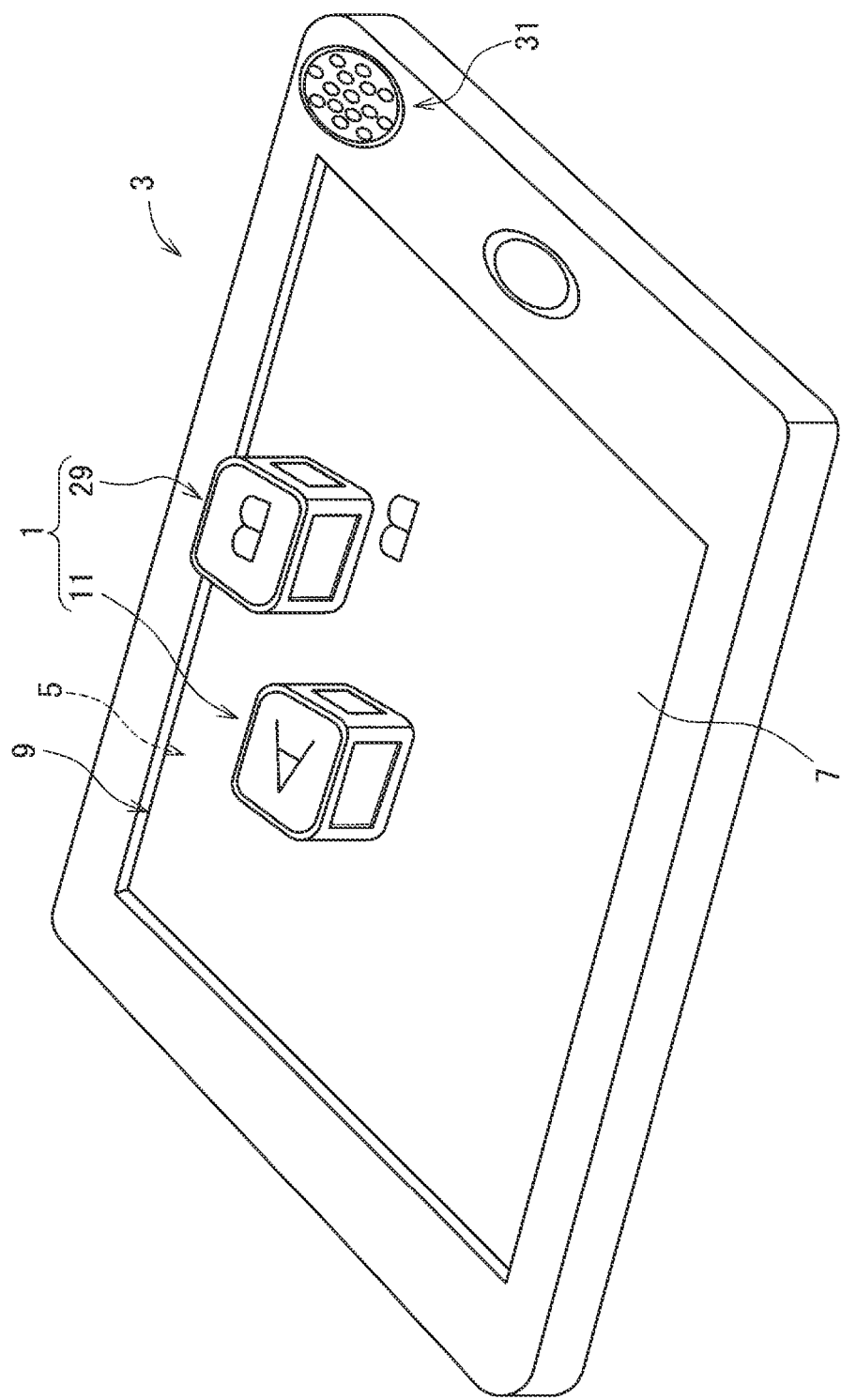
FIG. 1 is a perspective view illustrating an embodiment of the present invention.

As shown in FIG. 1, the input device set 1 of this embodiment is used on a terminal 3 with a touch panel 9. The terminal 3 is, for example, a tablet terminal having a display panel 5 (FIG. 9), a so-called multi-touch touch panel 9, which is laminated on the display panel 5 and outputs signals representing coordinates of contacts touching a placing surface 7, and a processing unit 39 (FIG. 9) that receives coordinate information from the touch panel 9 and controls the display panel 5. The terminal 3 of this embodiment includes an electrostatic capacitance type touch panel 9.

Figure 2:
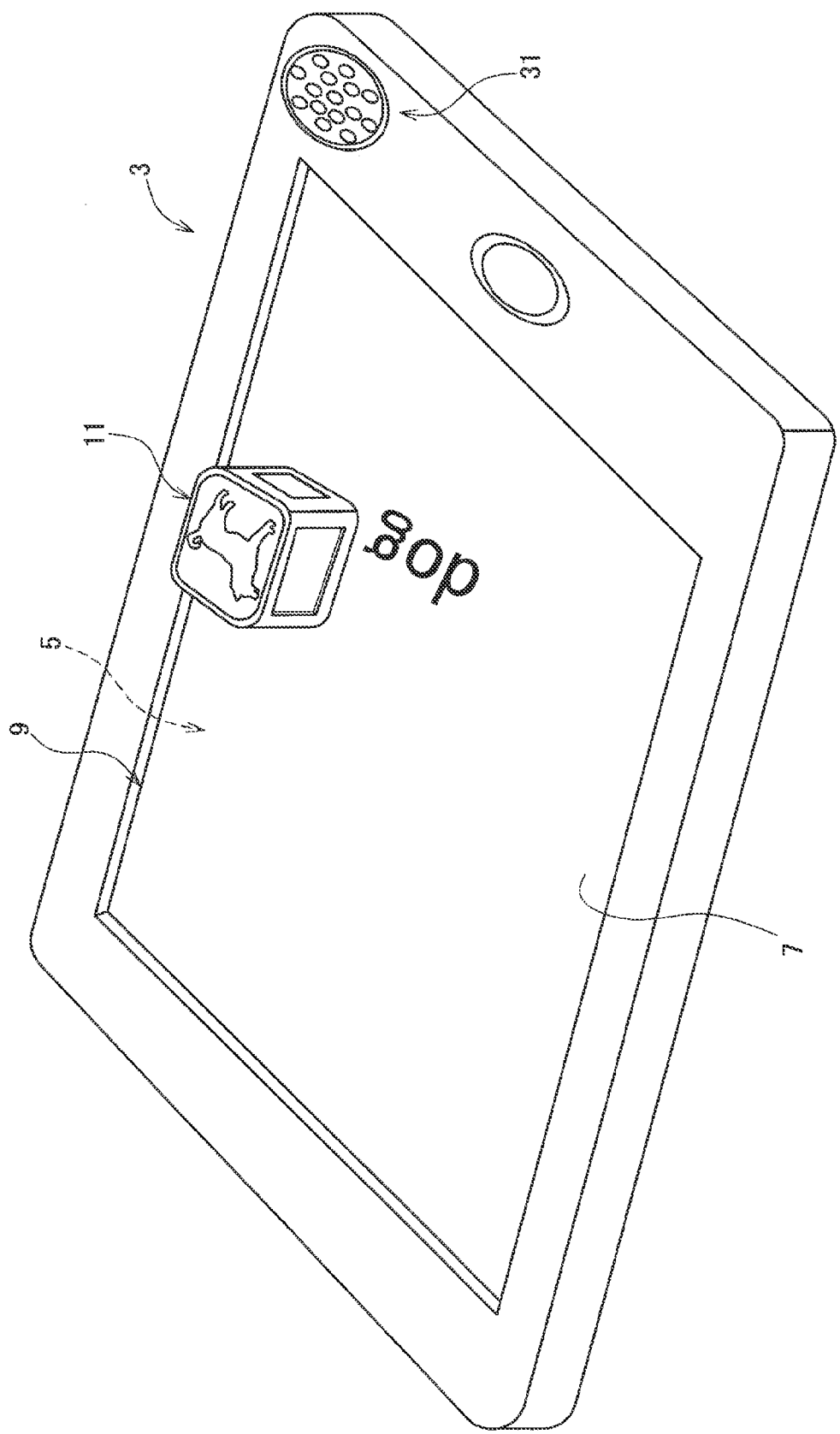
FIG. 2 is a perspective view illustrating another embodiment of the present invention.

The input device set 1 of this embodiment is placed on the touch panel 9, and is a collection of respectively identifiable input devices 11. Each input device 11 is provided with specific information. The specific information is information about, for example, hiragana such as "あ", "い", "う", "え", "お", alphabets such as "A", "B", "C", "D", numbers such as "0", "1", "2", "3", "4", and related image information and/or sound information. Alternatively, specific information may be information about vehicles, such as car, ship, airplane, and train. As discussed later, the specific information is displayed on the display panel 5 when the terminal identifies an input device 11 placed on the touch panel 9. The displayed specific information is not limited to a single pattern but changeable as appropriate. In other words, a storing unit of the terminal, which is discussed later, stores specific information in a changeable way. This makes it possible to display, for example, a picture of a dog, "dog" as shown in FIG. 2, or "犬", in a case where an input device 11 with the picture of dog is placed.

Figure 5:
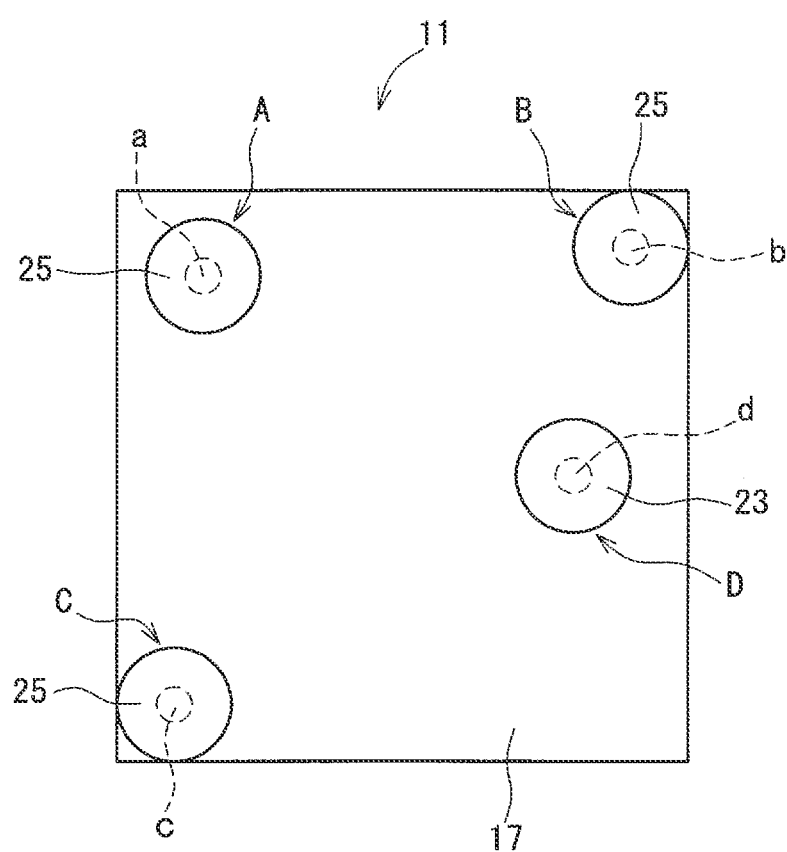
FIG. 5 is a diagram illustrating a bottom surface of the input device.
Figure 6:
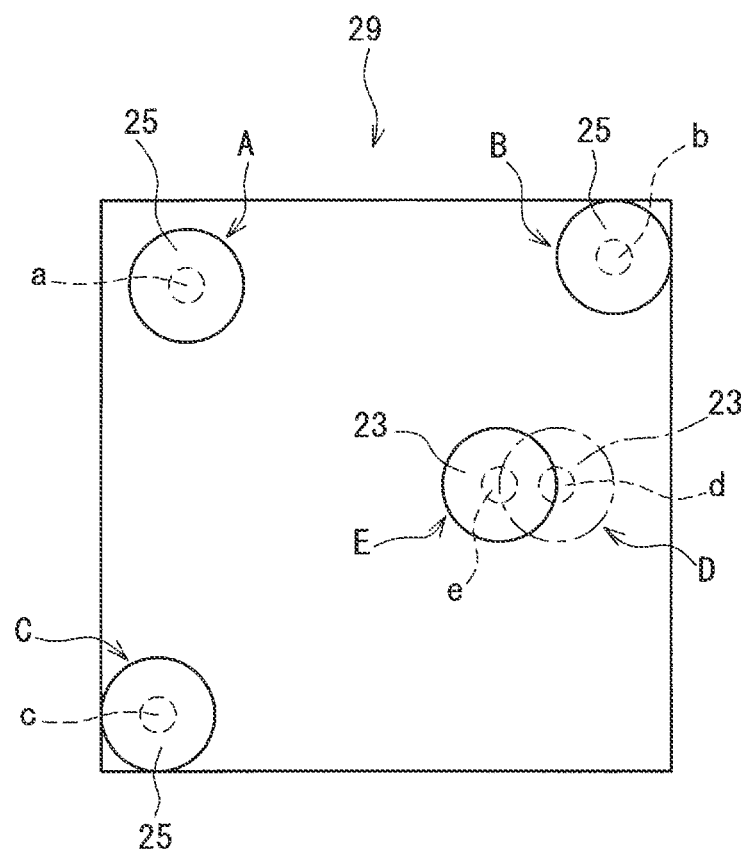
FIG. 6 is a diagram illustrating a bottom surface of another input device.

A base 13 is formed on the input device 11. The input device 11 includes an identifying contact D and reference contacts A, B, and C which input coordinates in the touch panel 9 (FIGS. 4-6).

Figure 3:
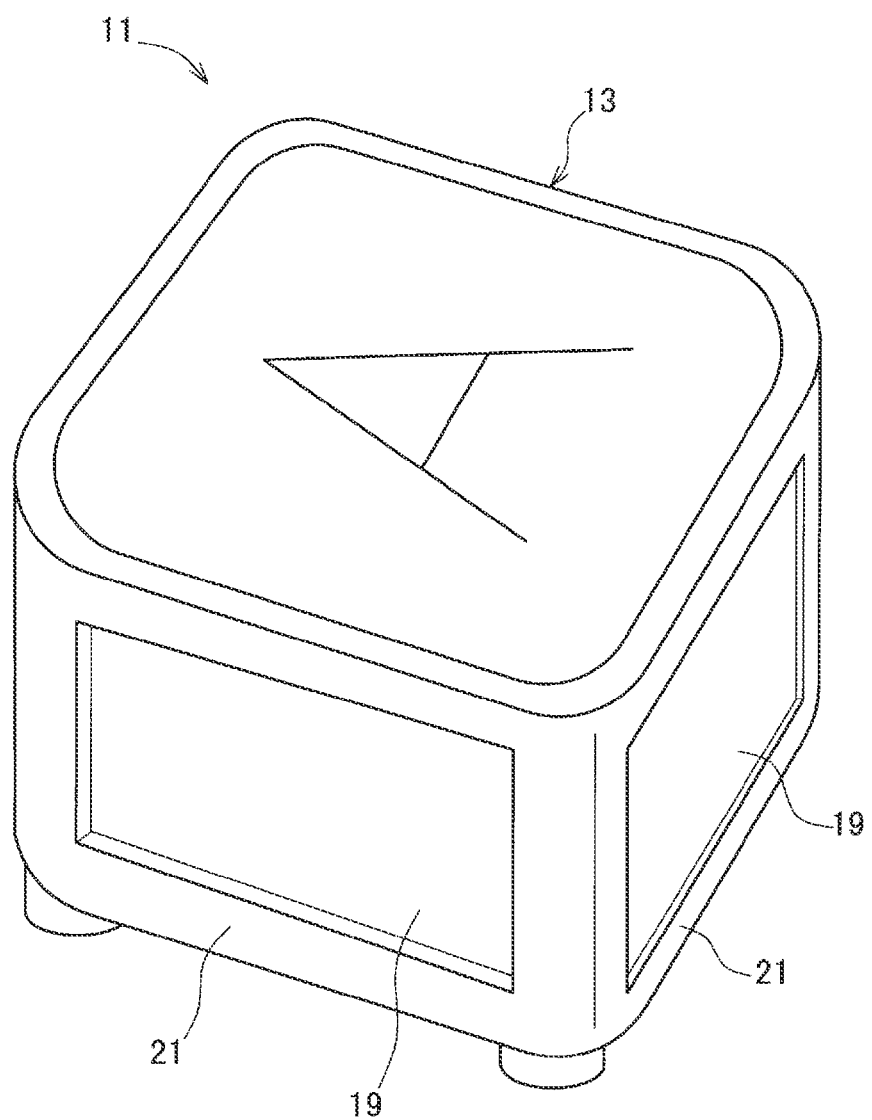
FIG. 3 is a perspective view of an input device.
Figure 4:
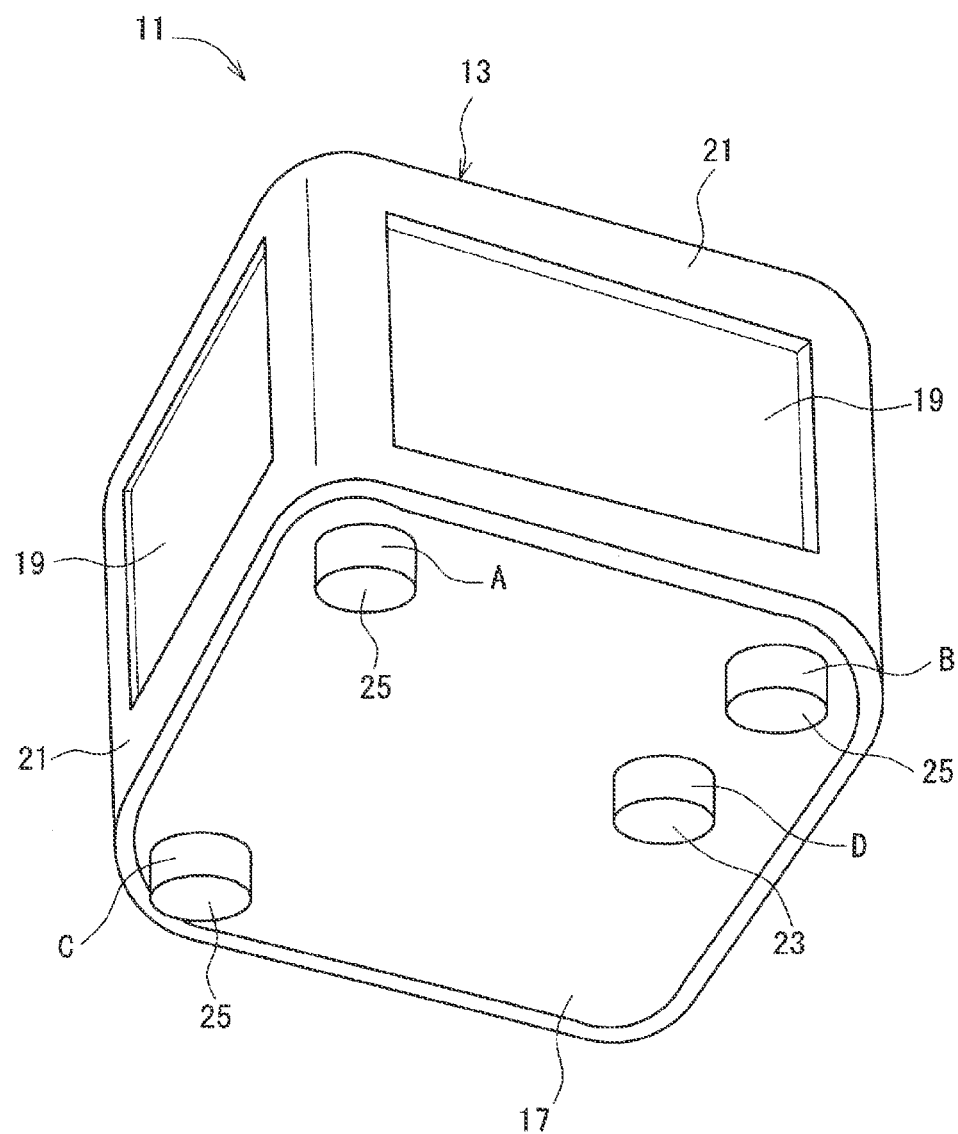
FIG. 4 is a perspective view of the input device.

The base 13 is shaped, for example, in a form of cube as shown in FIGS. 3 and 4. The shape of the base 13 is not limited to a cube, but may be, for example, cylinder, polygonal column, or frustums of cone or polygonal pyramid. Alternatively, the base 13 may be formed in a shape indicated by specific information provided to an input device 11. For example, abase 13 of an input device 11 having specific information "A" may be shaped in a form of three-dimensional "A." The base 13 includes a facing surface 17 and holding parts 19.

As shown in FIG. 4, a facing surface 17 of the base 13 is disposed to face the placing surface 7 of the touch panel 9. The shape of the facing surface 17 is not particularly limited, but typically, square. The shape is not limited to square, but may be other polygons or circles. The shapes of squares and polygons include those having rounded corners. The facing surface 17 of this embodiment has electric conductivity. The facing surface 17 is formed of, for example, conductive resin made of a mixture of resin and electrical conducting material, such as carbon. The facing surface 17 may be integrally molded of the holding parts 19, the identifying contact D, and the reference contacts A, B, and C described later.

The holding parts 19 of the base 13 are used by a user to hold the base 13. For example, as shown in FIGS. 3 and 4, the holding parts 19 are formed on side walls 21 of the base 13, where the side walls 21 are provided upwardly from the rim of the facing surface 17. For easier holding by the user, the holding parts 19 may be formed by recesses made on the side walls 21. Further, the holding parts 19 in this embodiment have electric conductivity, and are electrically connected with the facing surface 17.

As shown in FIGS. 4 and 5, the identifying contact D is formed to project from the facing surface 17, and has a contact surface 23 at the end for touching the placing surface 7 of the touch panel 9. The identifying contact D is for identifying each input device 11. Each input device 11 has an identifying contact D disposed on its facing surface 17 at a different position from one another. The identifying contact D is formed to project from the facing surface 17 in a cylindrical shape, although it is not limited to this but may be in a polygonal or a frustum shape. In the present invention, to touch the placing surface 7 includes to touch a sheet adhered to the placing surface 7. Further, to touch the placing surface 7 includes a case where the contact surface 23 is close enough the placing surface 7 such that coordinates are input into the touch panel 9.

As shown in FIGS. 4 and 5, the reference contacts A, B, and C are formed to project from the facing surface 17 in a cylindrical shape, and include three reference contacts A, B, and C each having a contact surface 25 at the end for touching the placing surface 7 of the touch panel 9. The shape of the reference contacts A, B, and C are not limited to a cylindrical shape, but may also be a polygonal or a frustum shape. The layout of reference contacts A, B, and C are not particularly limited, although input devices 11 constructing one input device set 1 respectively have reference contacts A, B, and C at the same positions. In order that attitudes of the placed input devices 11 are stabilized, the reference contacts A, B, and C are preferably formed at the rim of the facing surface 17. Further, reference contacts A, B, and C are preferably disposed to form an isosceles triangle having the center of gravity of each contact surface 25 as a vertex.

The contact surface 23 of the identifying contact D and the contact surfaces 25 of the reference contacts A, B, and C have areas necessary for the touch panel 9 to identify touches. The shape of the contact surfaces 23 and 25 is circle, although it is not limited to this but may be a polygonal shape, for example. The contact surfaces 23 and 25 in this embodiment have electric conductivity, and are conducted to the facing surface 17 and the holding parts 19.

As shown in FIG. 5, the contact surface 23 of the identifying contact D has coordinates identifying area d including the center of gravity of the contact surface 23, and the contact surfaces 25 of the reference contacts A, B, and C respectively have coordinates identifying areas a, b, and c including the center of gravity of the contact surfaces 25. The coordinates identifying areas a, b, and c are areas to be identified by the processing unit 39 of the terminal 3 as contact coordinates of the reference contacts A, B, and C with respect to the touch panel 9. The coordinates identifying areas d is an area to be identified by the processing unit 39 of the terminal 3 as contact coordinates of the identifying contact D with respect to the touch panel 9. That is, the coordinates identifying areas a, b, c, and d are within error ranges in which the processing unit 39 identifies the coordinates identifying areas a, b, c, and d as the centers of gravity of respective contact surfaces 23 and 25. The coordinates identifying areas a, b, c, and d are enlarged, reduced, or deformed according to performance of a terminal in use, such as resolution of a touch panel or processing of the processing unit 39. In this embodiment, the centers of gravity of the respective contact surfaces 23 and 25 are the centers of contact surfaces 23 and 25 in a case where the outside shape of contact surfaces 23 and 25 is circle or equilateral polygon. In a case of a polygon having distorted shapes of the contact surfaces 23 and 25, the centers of mass when the area formed by the polygon added with a fixed thickness are regarded as the centers of gravity of the respective contact surfaces 23 and 25 of the polygon.

In all input devices 11 constructing one input device set 1, identifying contacts D are disposed such that coordinates identifying areas d to reference contacts A, B, and C do not overlap one another, and areas of contact surfaces 23 to reference contacts A, B, and C are disposed so as to partially overlap each other in at least two input devices 11.

Figure 7:
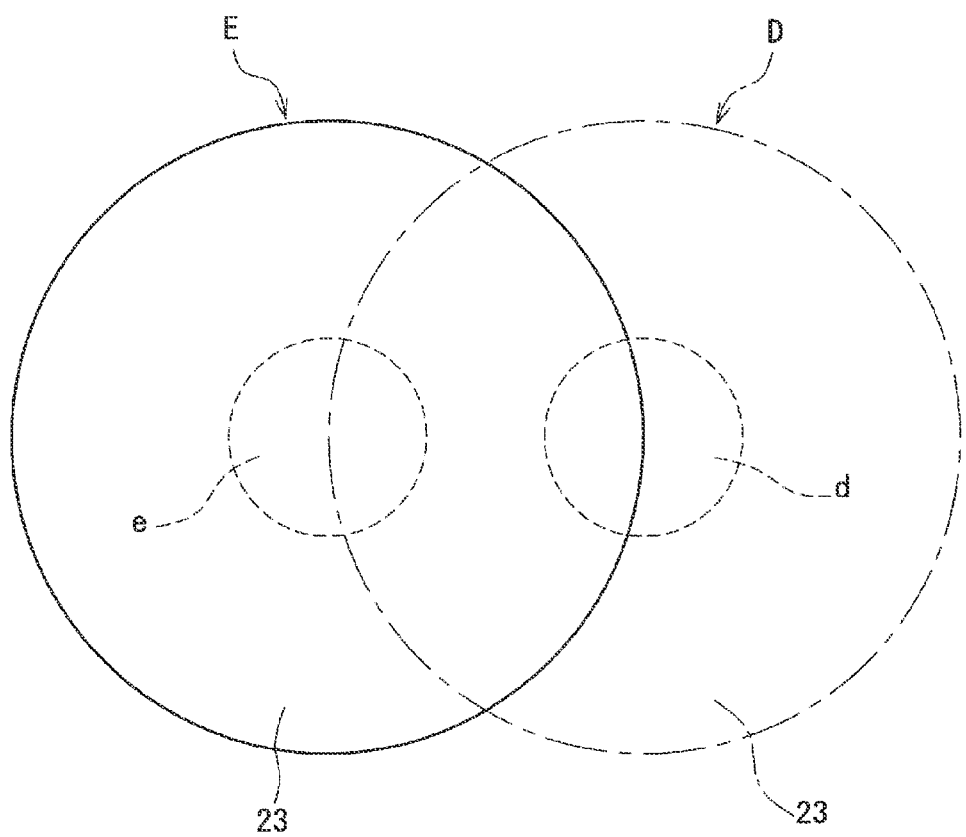
FIG. 7 is a diagram illustrating positional relationship between identifying contacts of one input device and another input device.

Specific examples will be discussed referring to FIGS. 6 and 7. FIG. 6 illustrates a facing surface 17 and contact surfaces 23 and 25 of reference contacts A, B, and C and an identifying contact E of another input device 29 (in the following, referred to as "another identifying contact E"). The contact surface 23 of an identifying contact D (hereinafter "one identifying contact D") of the above described input device 11 (hereinafter "one input device 11") is indicated in dot-and-dash line. The reference contacts A, B, and C of another input device 29 are disposed at the same positions as the one input device 11. FIG. 7 illustrates enlarged contact surfaces 23 of the one identifying contact D and another identifying contact E. As shown in FIG. 7, respective contact surfaces 23 of the one identifying contact D and another identifying contact E overlap partially each other, and the coordinates identifying area d of the one identifying contact D and the coordinates identifying area e of another identifying contact E are disposed so as not to overlap each other. Based on the difference between the layout positions of the one identifying contact D and another identifying contact E, the one input device 11 is discriminated from another input device 29. Further, in order to improve identification accuracy of terminals, the outer edge of the coordinates identifying area d of the one identifying contact D is preferably away from the outer edge of the coordinates identifying area e of another identifying contact E for a radius of coordinates identifying areas a, b, and c of the reference contacts A, B, and C or more.

Figure 8:
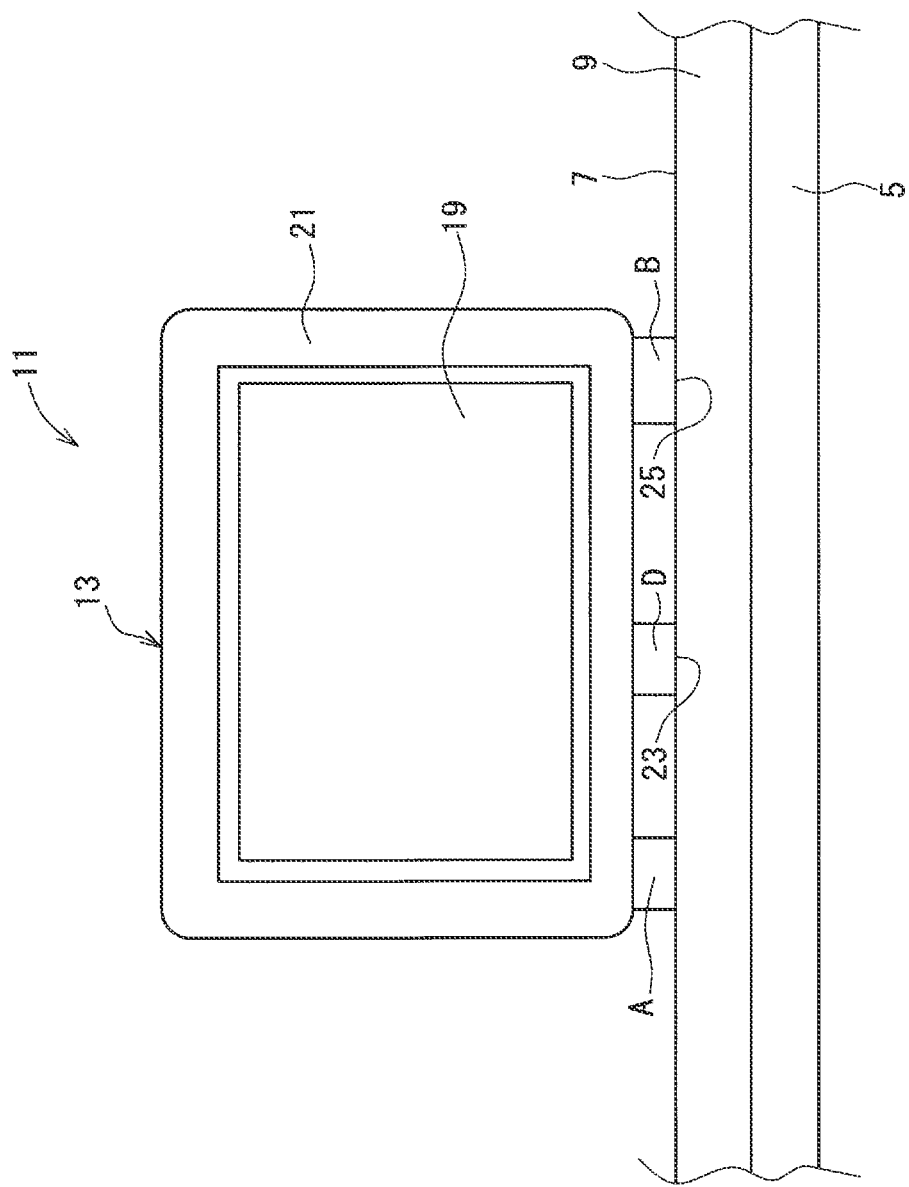
FIG. 8 is a side view of the input device placed on a touch panel.

When the input device 11 having the features described above is placed on the placing surface 7 of the touch panel 9, as shown in FIG. 8, the contact surface 23 of the identifying contact D touches the placing surface 7 of the touch panel 9. This enables the touch panel 9 to output a signal representing coordinates of the identifying contact D. Further, the contact surfaces 25 of the reference contacts A, B, and C also touch the placing surface 7 of the touch panel 9, and the touch panel 9 outputs a signal representing coordinates of three reference contacts A, B, and C. In this embodiment, when the contact surfaces 23 and 25 of the identifying contact D and the reference contacts A, B, and C touch the placing surface 7 of the touch panel 9, electrostatic capacitance of the touch panel 9 at the touched position is changed. By analyzing the change in signal accompanying the change in electrostatic capacitance, coordinates of the identifying contact D and the reference contacts A, B, and C can be obtained.

Figure 9:
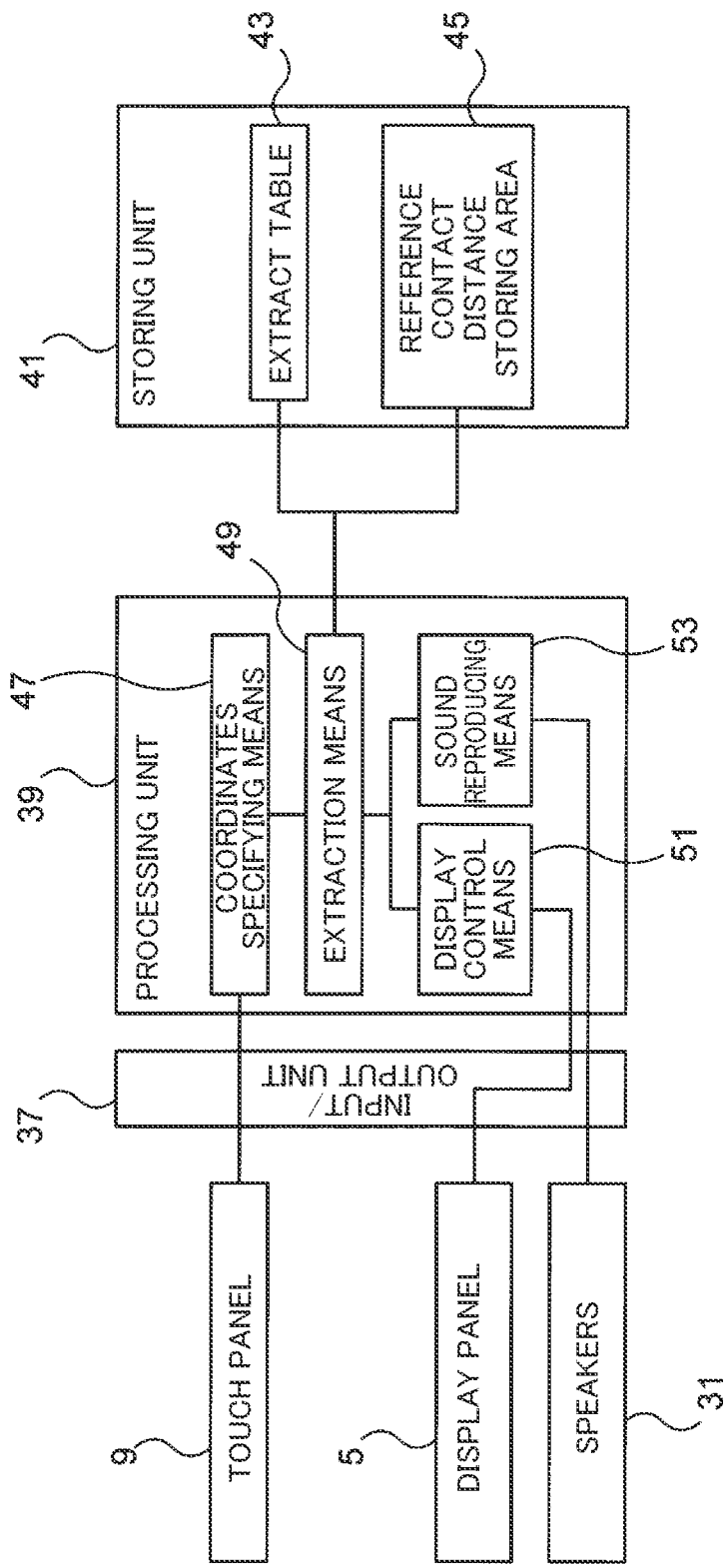
FIG. 9 is a block diagram of a terminal on which the input device set of an embodiment of the present invention is used.

Next, a terminal 3 on which the input device set 1 of this embodiment is used will be discussed. The terminal 3 is, for example, a tablet terminal, including a display panel 5, a touch panel 9, and processing unit 39 capable of establishing a communication with the display panel 5 and the touch panel 9 through an input/output unit 37, and a storing unit 41 (FIG. 9).

The storing unit 41 has an extract table 43 that stores distance information (hereinafter referred to as "identifying contact distance information") between the identifying contact D and the reference contacts A, B, and C in association with specific information. The storing unit 41 is, for example, an external memory provided to the terminal 3. The identifying contact distance information indicates, for example, distances between the center of gravity of the contact surface 23 of the identifying contact D and the centers of gravity of respective contact surfaces 25 of the reference contacts A, B, and C. The storing unit 41 may have an area (reference contact distance storing area 45) that stores distance information (hereinafter referred to as "reference contact distance information") between the centers of gravity of the contact surfaces 25 of the reference contacts A, B, and C.

The processing unit 39 is communicatively coupled to the storing unit 41, and includes coordinates specifying means 47 that receives a signal from the touch panel 9 to specify coordinates and extraction means 49 that calculates distances between the identifying contact D and the reference contacts A, B, and C based on the specified coordinates, and extracts specific information of the placed input device 11 from the storing unit 41 based on the calculated distances. The processing unit 39 is a central processing unit.

Figure 10:
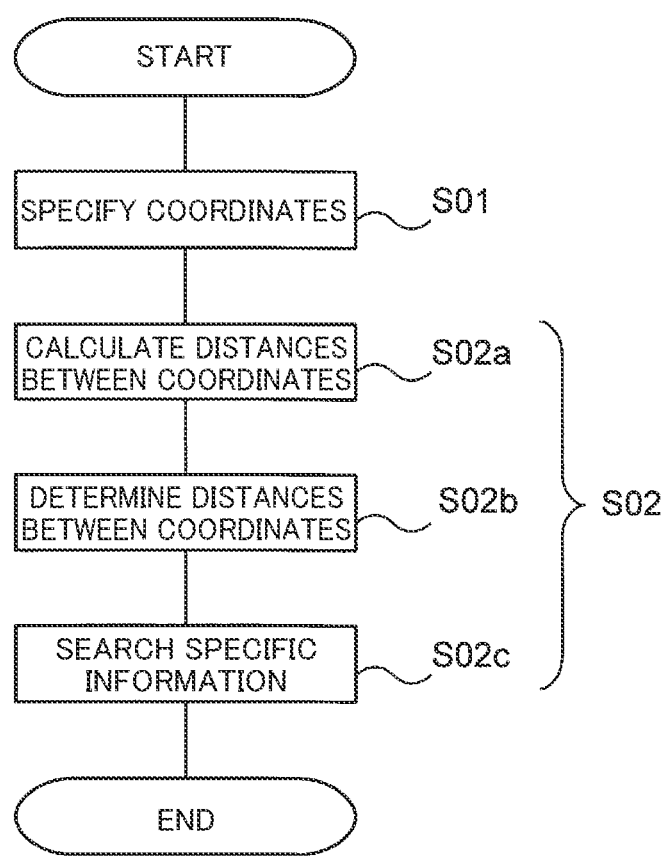
FIG. 10 is a flowchart of a processing unit of the terminal.

A flow associated with the processing unit 39 for obtaining specific information of the input device 11 will be described. As shown in FIG. 10, an obtaining method includes a coordinates specifying step (S01) and an extracting step (S02).

The coordinates specifying step (S01) is a step in which the coordinates specifying means 47 receives a signal from the touch panel 9 and specifies coordinates indicated by the received signal. The coordinate information obtained in this step indicates coordinates of points (hereinafter referred to as "Pa, Pb, Pc, Pd") included in the respective coordinates identifying areas a, b, c, and d.

In the extracting step (S02), the extraction means 49 calculates distances between the identifying contact D and the reference contacts A, B, and C based on the coordinates obtained in the coordinates specifying step (S01), and compares such distance information with the distance information stored in the storing unit 41 to extract specific information corresponding to the distance information having the highest matching degree.

The extracting step includes, for example, a distance calculating step (S02a), a determination step (S02b), and a search step (S02c). The distance calculating step (S02a) is a step in which the extraction means 49 calculates distances between the coordinates obtained in the coordinates specifying step (S01) (distances between Pa-Pb, Pa-Pc, Pa-Pd, Pb-Pc, Pb-Pd, Pc-Pd). The determination step (S02b) is a step for comparing these calculated values with reference contact distance information stored in the storing unit 41. This determines distances between respective reference contacts (distances between Pa-Pb, Pa-Pc, Pb-Pc) included in the calculated values and distances between the reference contacts and the identifying contact (distances between Pa-Pd, Pb-Pd, Pc-Pd) included in the calculated values. The search step (S02c) is a step for comparing the distances between the reference contacts and the identifying contact with the distance information of the extract table 43, and searching specific information stored in association with the matching or the most approximate distance information. With the steps described above, specific information of the input device 11 placed on the touch panel 9 is extracted.

As shown in FIG. 9, the processing unit 39 includes display control means 51 that displays specific information about an image on the display panel 5 and sound reproducing means 53 that outputs specific information about sound from speakers 31, for example. The display control means 51 displays an image B, which is specific information obtained in the extracting step (S02), on the display panel 5 as shown in FIG. 1. The position to display the image is, for example, near the placed input device 11. The sound reproducing means 53 outputs sound "beep", which is specific information obtained in the extracting step, from the speakers 31.

Figure 11:
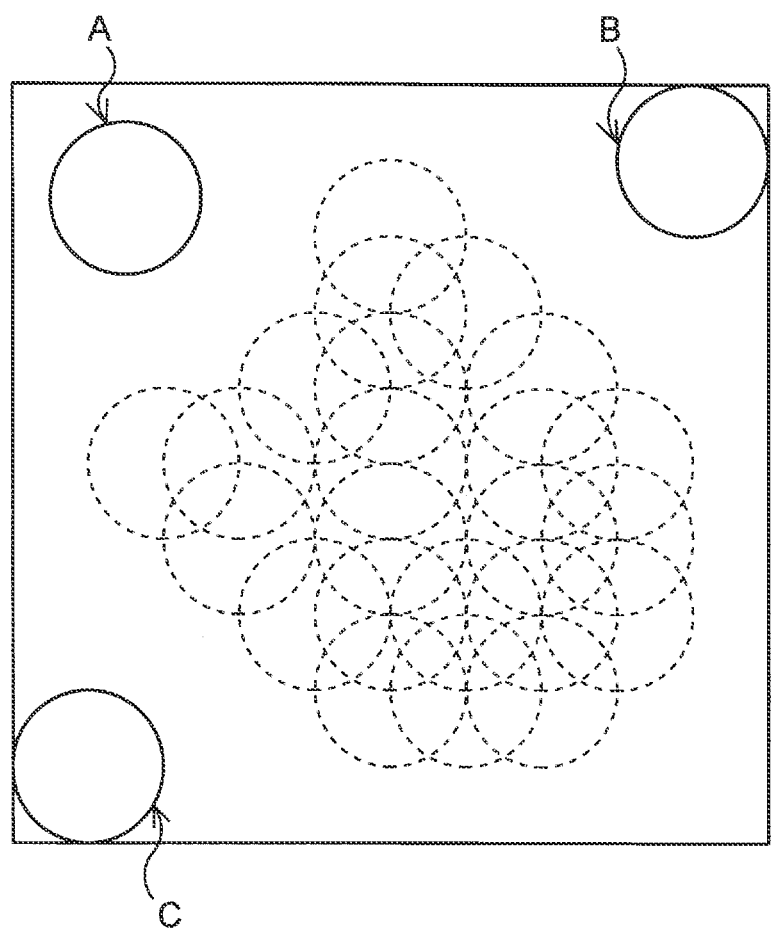
FIG. 11 is a diagram illustrating arrangement patterns of the identifying contacts.

As shown in FIGS. 6 and 7, in at least two input devices 11 and 29 included in the input device set 1 of this embodiment, respective identifying contacts D and E are placed such that respective areas of contact surfaces 23 partially overlap each other. FIG. 11 illustrates an arrangement pattern of identifying contacts of input devices constructing an input device set 1 in dashed lines. In this way, arrangement patterns of the identifying contacts can be increased without expanding the area of the facing surface 17. That is, the input device set 1 of this embodiment is capable of having lots of specific information, and excellent in operability. Further, the input device set 1 is excellent in recognizing coordinates of contact surfaces 23 and 25 of the reference contacts A, B, and C and the identifying contact D, since it is not necessary to reduce areas of the contact surfaces 23 and 25. The arrangement pattern shown in FIG. 11 is only an example, and other arrangement patterns may be employed.

The number of identifying contacts provided to each input device 11 is not limited to one, but a plurality of identifying contacts may be provided. Providing a plurality of identifying contacts enables to increase arrangement patterns of identifying contacts without expanding the area of the facing surface.

The number of reference contacts provided to an input device of this embodiment is not limited, and may be one. Alternatively, a plurality of reference contacts may be provided.

For example, two reference contacts A and B may be provided to corners of a square facing surface 17. In this case, distance information (identifying contact distance information) between the identifying contact D and two reference contacts A and B can be obtained. As such, compared to the case where the number of the reference contact is one, it is possible to provide more combinations of arrangement patterns of the identifying contact D within the same facing surface 17, and thus more specific information items can be provided. Further, in order to stabilize attitudes of the placed input devices 11, a projection that projects from the facing surface 17 and contacts with the placing surface 7 may be provided to a corner at which a reference contact is not placed. Preferably, the projection is shaped in a form of tapered cone or polygonal pyramid in order that coordinates are not input by the projection.

As described in the above embodiment, if three reference contacts A, B, and C are provided at the corners of the square facing surface 17, it is possible to detect an orientation of the input device 11 placed on the touch panel 9, as described later, while enabling more combinations of arrangement patterns of identifying contact D to be provided in the same facing surface 17. Further, although four or more reference contacts may be provided, three reference contacts may preferably be provided so as not to reduce areas to dispose the identifying contact D.

Figure 12:
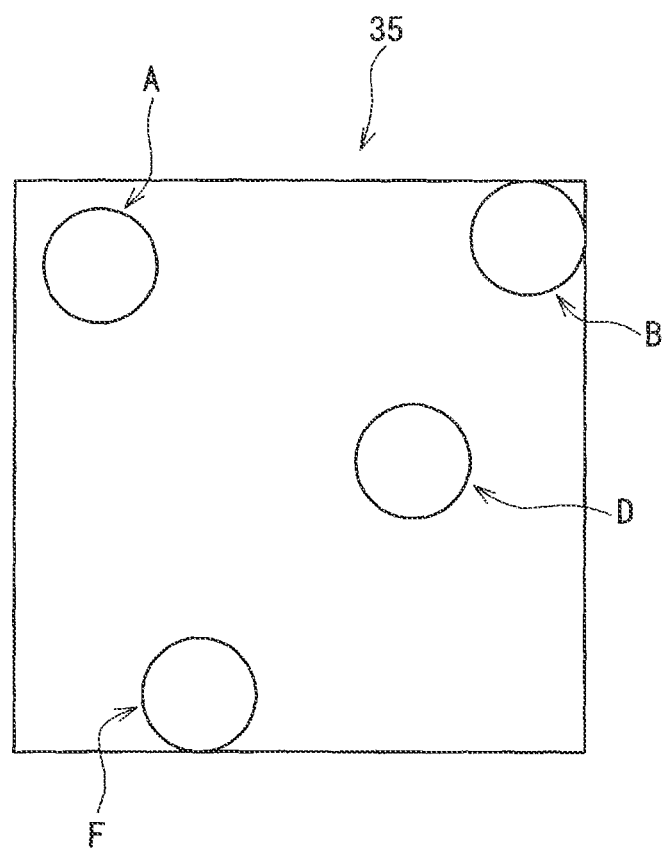
FIG. 12 is a diagram illustrating a bottom surface of another input device of the present invention.

The composite input device set according to this embodiment includes a plurality of input device sets 1 described above. An input device set 1 is a collection of input devices 11 having the same arrangement positions of reference contacts, and respective input device sets 1 have different arrangement positions of reference contacts from one another. For example, the composite input device set includes one input device set 1, which is a collection of input devices 11 having an arrangement pattern of reference contacts A, B, and C as shown in FIG. 5, and another input device set, which is a collection of input devices 35 having an arrangement pattern of reference contacts A, B, and F as shown in FIG. 12.

Each input device set 1 may have different system of specific information. For example, the input devices 11 of the one input device set 1 respectively have specific information of "A", "B", "C", . . . , which constructs a system of alphabets as a whole. The input devices 35 of another input device set respectively have specific information of "あ", "い", "う", . . . , which constructs a system of hiragana as a whole.

The orientation of the input device 11 placed on the touch panel 9 may be detected by using the input device 11 having three reference contacts A, B, and C on the facing surface 17 as described above.

The processing unit 39 has orientation detecting means that detects an orientation of the input device 11 placed on the touch panel 9 based on the coordinate information obtained in the coordinates obtaining step (S01). Examples of methods for detecting an orientation by the orientation detecting means include calculating distances of respective coordinates (distances between Pa-Pb, Pa-Pc, Pa-Pd, Pb-Pc, Pb-Pd, and Pc-Pd) based on the coordinate information obtained in the coordinates obtaining step (S01), and comparing respective distances between reference contacts with the reference contact distance information to select one of the distances. Then, a segment in the bottom of the triangle formed by the reference contacts is selected based on the selected distance between the reference contacts, and, by setting the center coordinates of the segment as the origin, calculates an inclination of the segment connecting the origin and the coordinates of the opposite vertex. This enables to calculate the inclination of the input device 11. The method for detecting the orientation of the input device 11 by the orientation detecting means is not limited to this example, but other detecting methods may be used.

As described above, the orientation of the input device 11, which has three reference contacts A, B, and C on the facing surface 17, to the touch panel 9 is detected. This enables the display panel 5 to display an image according to the orientation of the input device 11.

In the following, a specific embodiment of the present invention will be described. One input device 11 shown in FIG. 5 has specific information "A", and has a facing surface 17 that is a 40 mm×40 mm square and reference contacts A, B, and C respectively having circular contact surfaces 25 of diameter 8 mm and an identifying contact D having circular contact surface 23 of diameter 8 mm. The distances between centers of the reference contacts are 30.1 mm between A and B, 30.1 mm between A and C, and 45.3 mm between B and C. The distances between centers of each of the reference contacts A, B, and C and the identifying contact D are 26.1 mm between A and D, 17.9 mm between B and D, and 28.8 mm between C and D. The coordinates identifying areas a, b, and c of the contact surfaces 25 of the reference contacts A, B, and C are circular areas each having 1 mm radial distance from the centers of the contact surfaces 25. The coordinates identifying area d of the contact surface 23 of the identifying contact D is a circular area having 1 mm radial distance from the center of the contact surface 23.

Another input device 29 shown in FIG. 6 has specific information "B", and shares the common shapes of a facing surface 17, shapes of contact surfaces 23 and 25 of respective reference contacts A, B, and C and an identifying contact E, and an arrangement position of the reference contacts A, B, and C on the facing surface 17 with the one input device 11, and different arrangement position of the identifying contact E from the one input device 11. The distances between centers of the reference contacts A, B, and C are 29.5 mm between A and E, 16.5 mm between B and E, and 32.3 mm between C and E. The coordinates identifying areas a, b, and c of the contact surfaces 25 of the reference contacts A, B, and C are circular areas each having 1 mm radial distance from the centers of the contact surfaces 25. The coordinates identifying areas e of the contact surface 23 of the identifying contact E is a circular area having 1 mm radial distance from the center of the contact surface 23.

The one input device 11 is apart from another input device 29 for a distance of 4 mm between the centers of the respective contact surfaces 23 of the identifying contacts D and E. As such, the outer edges of the coordinates identifying areas d and e are 2 mm apart at the shortest distance. As shown in FIG. 7, the contact surfaces 23 of the identifying contacts D and E partially overlap each other. When these input devices are placed on the placing surface 7 of the touch panel 9, specific information "A" is recognized from the one input device 11, and specific information "B" is recognized from another input device 29.

The input device 11 of this embodiment can employ 50 or more arrangement patterns of the identifying contact D in a 40 mm×40 mm square of the facing surface 17, and thus an input device set 1, which is a collection of 50 or more specific information items, is achieved.

Embodiment 2

In the present invention, an input device set may be a collection of input devices having no reference contact.

Figure 13:
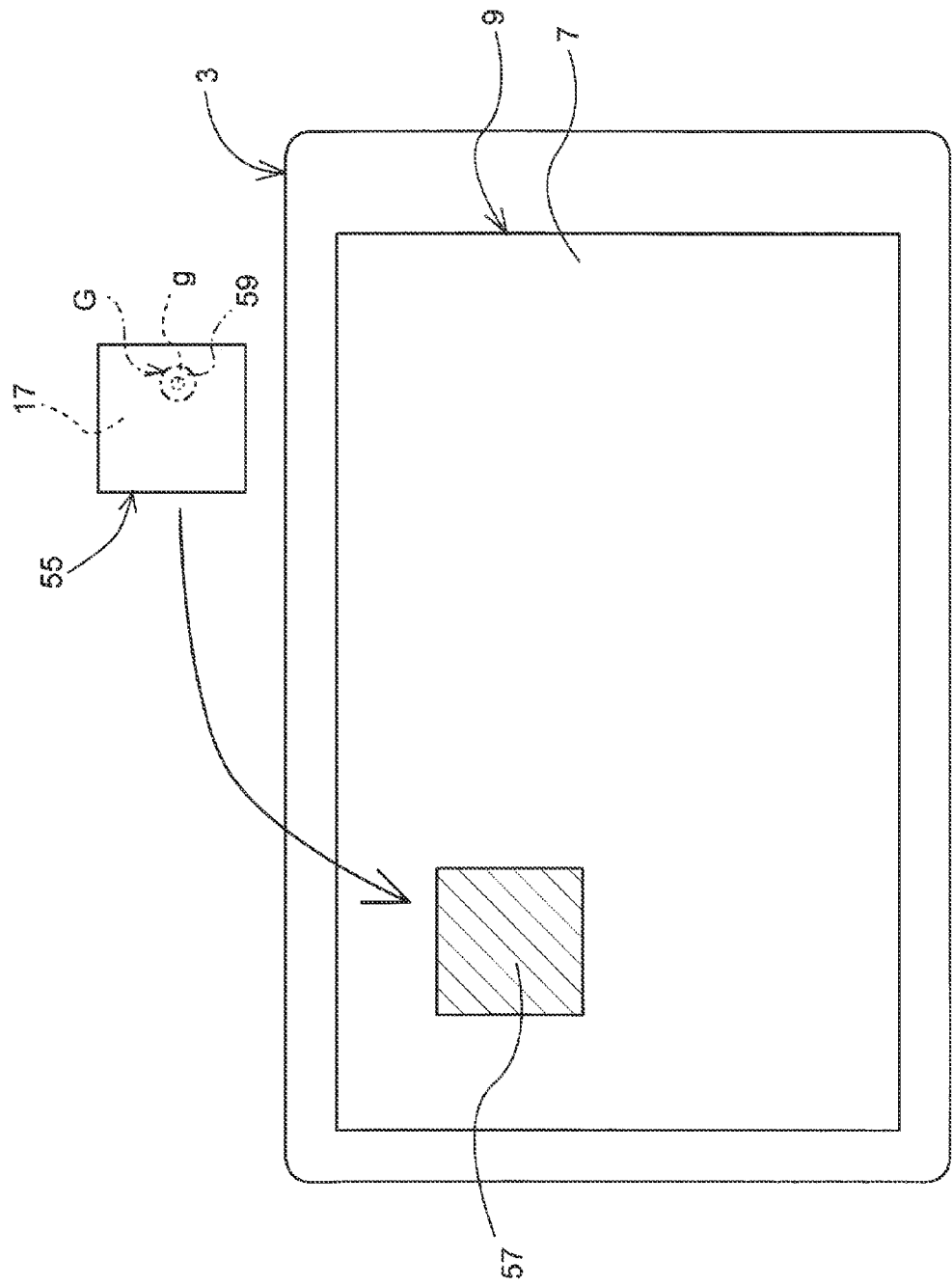
FIG. 13 is a diagram illustrating an example of use of yet another input device of the present invention.

As shown in FIG. 13, each of input devices 55 constructing the input device set has a contact G which projects from the facing surface 17 facing the placing surface 7 of the touch panel 9 for inputting coordinates into the touch panel 9. The contact G has the same structure as the identifying contact D described above, and includes a contact surface 59 for touching the placing surface 7 to input coordinates. The contact surface 59 has a coordinates identifying area g including the center of gravity of the contact surface 59. All of input devices 55 have the same shape of the facing surface 17.

As shown in FIG. 7, the coordinates identifying areas g of the contacts G of all of input devices 55 to the facing surface 17 are disposed so as not to overlap one another, and areas of the contact surfaces 59 of at least two input devices 55 to the facing surface 17 are disposed so as to partially overlap each other. In this embodiment, the contact surface 59 and the coordinates identifying area g to the facing surface 17 indicate positions and ranges of the contact surface 59 and the coordinates identifying area g on an area on which the facing surface 17 is projected when the facing surface 17 is projected on the placing surface 7 of the touch panel 9.

An example in which the terminal 3 obtains specific information of the input device 55 of this embodiment will be discussed.

The extract table 43 of the storing unit 41 of the terminal 3, on which the input device 55 is used, stores coordinate information of the coordinates identifying area g of the contact G to the facing surface 17 in association with the specific information.

The processing unit 39 of the terminal 3 has placement information output means that outputs placement information 57 to the display panel 5. The placement information 57 is information about a range in which the input device 55 is placed and an orientation of placement of the input device 55. For example, placement information 57 is information about the outer edge of the facing surface 17 of the input device 55 and the orientation of the facing surface 17 of the input device 55.

A flow associated with the processing unit 39 of the terminal 3, on which the input device set of this embodiment is used, obtaining specific information of the input device 55 will be described. Obtaining specific information includes a placement information outputting step, a coordinates specifying step, and an extracting step.

The placement information outputting step is a step in which the placement information output means outputs placement information 57 to the display panel 5. In this step, a placement position and a placement orientation of the input device 55 is specified for a user. The coordinates specifying step of this embodiment is a step in which the coordinates specifying means receives a signal from the touch panel 9 and specifies coordinates indicated by the signal. In this step, the coordinates of the contact G can be obtained. The extracting step of this embodiment is a step in which the coordinates in the placement range included in the placement information are compare with the coordinate information of the extract table, and the specific information, which is stored in association with the matching or the most approximate coordinate information, is extracted. In this way, an input device having no reference contact can be identified.

Although while the input device set and the composite input device set of some embodiments have been described so far, it is to be understood that various improvements, modifications, and variations can be made based on knowledge of those skilled in the art without departing from the spirit of the present invention, and such improvements, modifications, and variations fall within the spirit of the invention.

For example, the input device set 1 of the present invention is not limited to be used for the terminal 3 including an electrostatic capacitance type touch panel, but may be used for a terminal including, for example, a resistive film type touch panel for detecting voltage change by oppositely laminating thin metal films formed of a transparent electrode, a surface acoustic wave system touch panel for detecting a touched location by a generated voltage of a piezoelectric element with the piezoelectric element attached to a glass substrate, or an electromagnetic induction system touch panel using an electronic pen.

The invention claimed is:

1. An input device set that is placed on a touch panel comprising:
   a collection of individually identifiable input devices, each of the input devices having a base and a plurality of contacts;
   wherein the plurality of contacts project from the base;
   wherein the plurality of contacts input coordinates into the touch panel;
   wherein each of the contacts includes a contact surface that touches a placing surface of the touch panel and inputs the coordinates;
   wherein the contact surface includes a coordinates identifying area that includes a center of gravity of the contact surface;
   wherein the coordinates identifying areas in each of the input devices are disposed so as not to overlap one another among the input devices, and
   wherein areas of the contact surfaces are disposed so as to overlap in at least two input devices.

2. The input device set according to claim 1,
   wherein the contacts include one or more reference contacts and an identifying contact,
   wherein the coordinates identifying areas of the identifying contact and the reference contacts are disposed so as not to overlap one another among each of the input devices.

3. The input device set according to claim 2,
   wherein a plurality of the reference contacts are provided to the base.

4. The input device set according to claim 2, wherein the reference contacts are provided at three places on the base.

5. A composite input device set comprising a plurality of input device sets, each of which is placed on a touch panel, each input device sets comprising:
   a collection of individually identifiable input devices, each of the input devices having a base and a plurality of contacts;
   wherein the plurality of contacts project from the base;
   wherein the plurality of contacts input coordinates into the touch panel;
   wherein each of the contacts includes a contact surface that touches a placing surface of the touch panel and inputs the coordinates;
   wherein the contact surface includes a coordinates identifying area that includes a center of gravity of the contact surface;
   wherein the coordinates identifying areas in each of the input devices are disposed so as not to overlap one another among the input devices; and
   wherein areas of the contact surfaces are disposed so as to overlap in at least two input devices;
   wherein the contacts include one or more reference contacts and an identifying contact; and
   wherein the coordinates identifying areas of the identifying contact and the reference contacts are disposed so as not to overlap one another among each of the input devices.

6. The composite input device set comprising the plurality of input device sets according to claim 5,
   wherein each of the input device sets is given a different system of specific information.

7. The composite input device set comprising the plurality of input device sets according to claim 5,
   wherein a plurality of the reference contacts of each input device sets are provided to the base.

8. The composite input device set comprising the plurality of input device sets according to claim 7,
   wherein each of the input device sets is given a different system of specific information.

9. The composite input device set comprising the plurality of input device sets according to claim 5,
   wherein the reference contacts of each input device sets are provided at three places on the base.

10. The composite input device set comprising the plurality of input device sets according to claim 9,
    wherein each of the input device sets is given a different system of specific information.

* * * * *